United States Patent [19]

Kendall

[11] Patent Number: 5,209,571
[45] Date of Patent: May 11, 1993

[54] DEVICE FOR MEASURING THE TEMPERATURE OF A MOLTEN METAL

[75] Inventor: Martin Kendall, Sheffield, England

[73] Assignee: Heraeus Electro-Nite International N.V., Antwerp, Belgium

[21] Appl. No.: 910,964

[22] Filed: Jul. 9, 1992

[51] Int. Cl.⁵ .................................. G01K 1/12
[52] U.S. Cl. .................... 374/139; 374/179; 374/208; 136/233
[58] Field of Search .............. 374/139, 140, 158, 179, 374/208, 209; 136/230, 232, 233

[56] References Cited

U.S. PATENT DOCUMENTS

| | | | |
|---|---|---|---|
| 3,232,794 | 2/1966 | Korton | 374/179 |
| 3,408,607 | 10/1968 | Davis | 136/233 |
| 3,554,816 | 1/1971 | Moen | 136/233 |
| 3,649,368 | 3/1972 | Sine | 136/232 |
| 3,996,071 | 12/1976 | Klicks et al. | 136/233 |
| 4,012,708 | 7/1978 | Dancy | 136/233 |
| 4,060,095 | 11/1977 | Kurita | 136/232 |
| 4,721,534 | 1/1988 | Philllippi et al. | 374/179 |
| 4,724,428 | 2/1988 | Brown, Jr. | 374/139 |
| 4,871,263 | 10/1989 | Wilson | 374/139 |
| 4,977,001 | 12/1990 | Greenspan | 374/208 |

FOREIGN PATENT DOCUMENTS 2427992  3/1975  Fed. Rep. of Germany ...... 374/179

Primary Examiner—William A. Cuchlinski, Jr.
Assistant Examiner—G. Bradley Bennett
Attorney, Agent, or Firm—Panitch, Schwarze, Jacobs & Nadel

[57] ABSTRACT

The present invention is a device for measuring the temperature of a molten metal. The device includes a thermocouple element, a housing consisting of a heat-resistant material and a retainer member for receiving the thermocouple element. The retainer member has an open end and a closed end. The thermocouple element has a hot junction located proximate the closed end of the retainer member. The retainer member is positioned within the housing and is smaller in size than the housing to define a cavity therebetween. The cavity is substantially filled by a protective material which includes a metal oxide component and an oxygen reducing component.

18 Claims, 2 Drawing Sheets

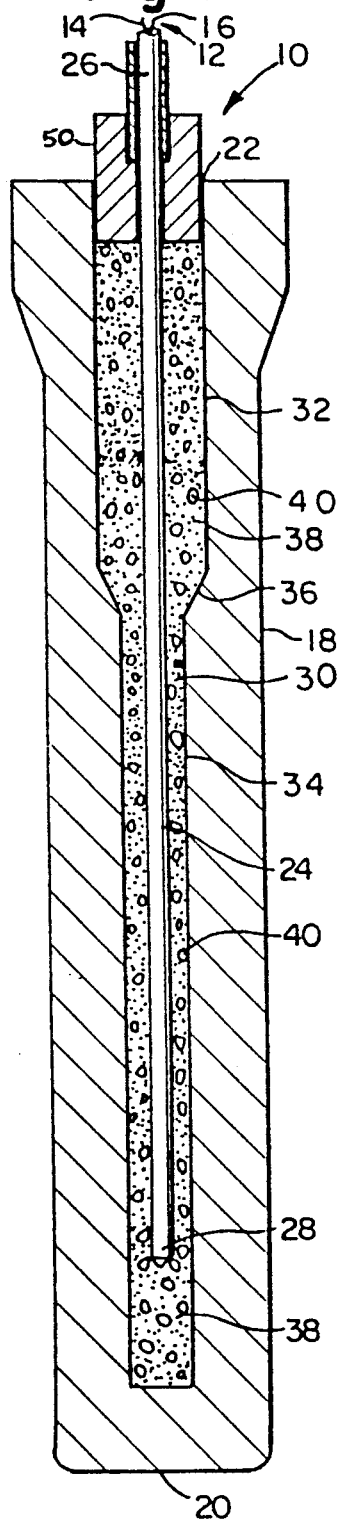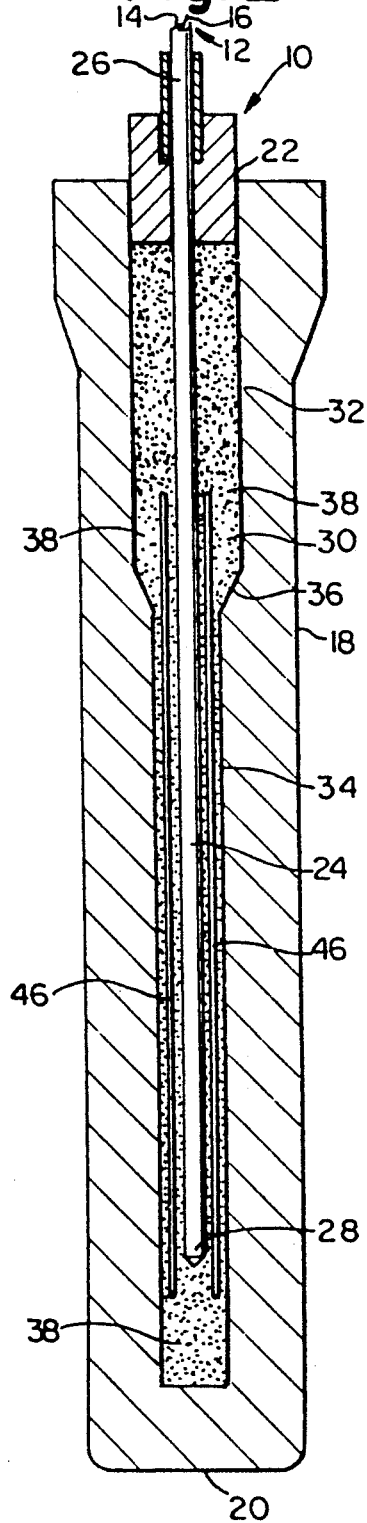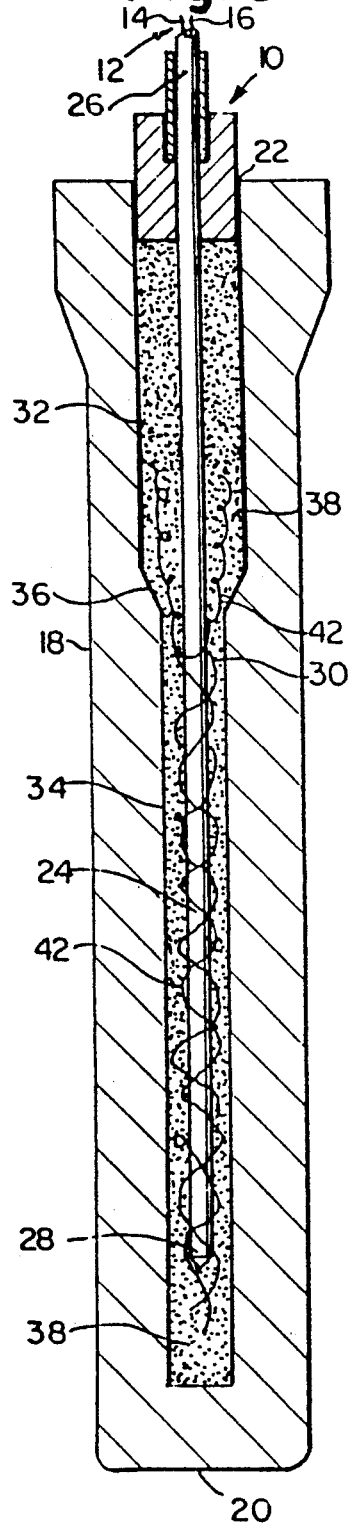

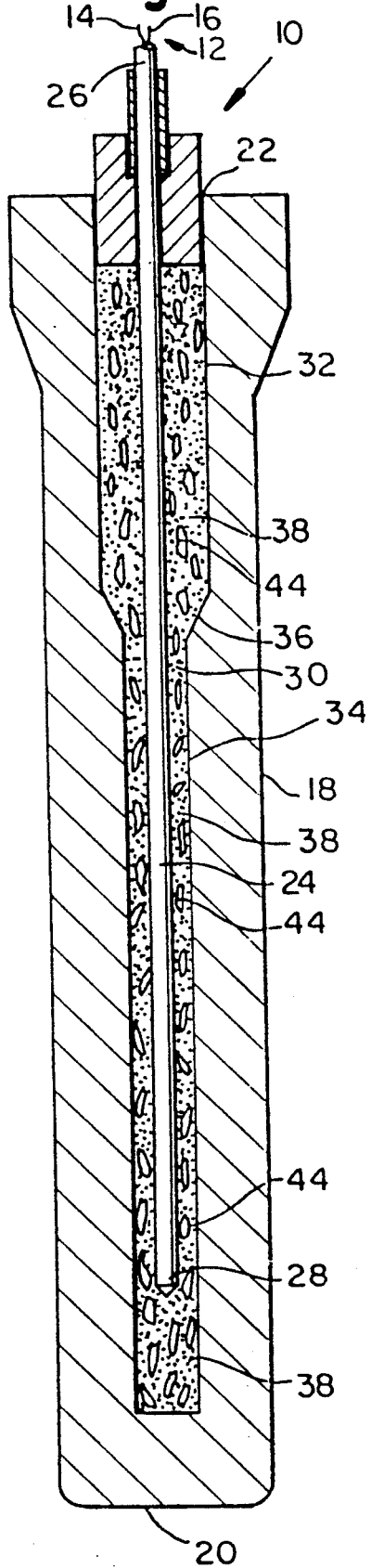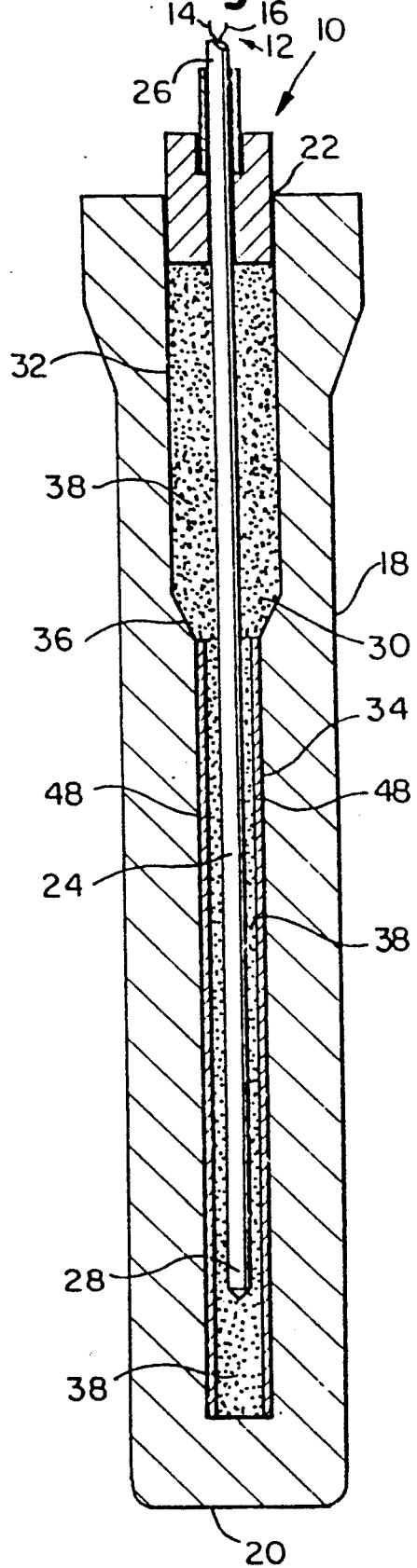

DEVICE FOR MEASURING THE TEMPERATURE OF A MOLTEN METAL

FIELD OF THE INVENTION

The invention relates to a thermocouple device for measuring the temperature of a molten metal and, more particularly to a thermocouple device in which the thermocouple element is protected against chemical attack.

BACKGROUND OF THE INVENTION

The temperature of molten metal processes may exceed 3000° F. Thermocouple devices for monitoring the temperature of a molten metal must resist deterioration when subjected to high temperatures and a highly reactive molten metal environment while providing accurate temperature measurements for controlling the temperature of the melt.

Typically, a thermocouple consists of a positive element and a negative element joined at each of their respective ends such that a measurable electric current flows in a continuous circuit through the elements depending upon the temperatures of the two junctions at which the elements are joined.

The positive and negative elements may, for example, be formed from wires of different metals. The combination of a positive element of platinum/30% rhodium and a negative element of platinum/6% rhodium is useful for measuring temperatures ranging from about 1600° to about 3100° F. Another typical positive element/negative element thermocouple combination is platinum/13% rhodium and platinum, which is suitable for measuring temperatures ranging up to about 2700° F.

The positive and negative elements are joined at a hot junction, which is subjected to the temperature of the molten metal. The positive and negative elements may be joined by any means that will ensure good electrical contact when in use. Typically, the positive and negative wires are twisted together and welded to form the hot junction.

The metal components of the thermocouple, particularly platinum, are expensive. Therefore, it is desirable to shield the elements from the harsh environment of the molten metal to prolong the useful life of the thermocouple and lessen the frequency at which the thermocouple must be replaced, as well as to ensure the accuracy of temperature measurements. Consequently, in industrial applications, the thermocouple is usually placed within a protective tube.

In the prior art, there is disclosed a closed-end protective tube which encloses a thermocouple element. The thermocouple element may be formed from platinum. The protective tube is disposed in a protective outer sheath consisting generally of a heat-resistant metal oxide and graphite. An annulus or cavity is generally formed between the exterior of the closed-end protective tube and the interior of the protective outer sheath. Unfortunately, silicon monoxide and carbon monoxide may be formed in the cavity of such a device when the device is subjected to the high temperatures of the metal melt. These highly corrosive and reactive gases may penetrate the material of the closed-end protective tube. Carbon monoxide may increase the porosity and damage or destroy the protective tube. A damaged tube permits silicon monoxide to react with and damage or destroy the thermocouple element. The temperature measurements derived from the damaged thermocouple element may be faulty or nonexistant.

Also disclosed in the prior art is a thermocouple element encased in a closed-end ceramic coated impermeable molybdenum tube. The tube is embedded in a protective sheath consisting of a plurality of ceramic layers, the concentration of molybdenum decreasing in each successive outer layer. The layers compensate for temperature gradients along the length of the molybdenum tube. The ceramic coated tube is embedded in a protective sheath by a ceramic mass. In addition to being extremely expensive and difficult to produce, this device is susceptible to mechanical damage during routine handling.

The present invention comprises a thermocouple device which provides protection against chemical attack by the harsh molten metal environment. The device also prevents formation of reactive gases, such as silicon monoxide or carbon monoxide within the device, which are capable of damaging or destroying the thermocouple element. By increasing the life expectancy of the thermocouple element, the present temperature sensing device provides more accurate temperature measurements which enable the melt to be more closely controlled. By increasing the lifetime of the thermocouple element, the device may be replaced less often and the associated costs of replacement, such as disassembling and reassembling process equipment, may be ameliorated.

SUMMARY OF THE INVENTION

According to the present invention, the above and other deficiencies of the prior art are alleviated or eliminated by the present device for measuring the temperature of a molten metal. The device comprises a thermocouple element, a housing comprised of a heat-resistant material and a retainer member for receiving the thermocouple element. The retainer member has an open end and closed end. The thermocouple element has a hot junction located proximate the closed end of the retainer member. The retainer member is positioned within the housing and is smaller in size than the housing to define a cavity therebetween. The cavity is substantially filled by a protective material comprising a metal oxide component and an oxygen reducing component.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred, it being understood, however, that the invention is not limited to the specific arrangements and instrumentalities disclosed. In the drawings:

FIG. 1 is a schematic of a side elevational view of a thermocouple device in accordance with the present invention, in which the oxygen reducing component is a powder;

FIG. 2 is a schematic of a side elevational view of an alternative embodiment of the thermocouple device of the present invention, in which the oxygen reducing component consists of a plurality of rods;

FIG. 3 is a schematic of a side elevational view of an alternative embodiment of the thermocouple device of the present invention, in which the oxygen reducing component consists of wires;

FIG. 4 is a schematic of a side elevational view of an alternative embodiment of the thermocouple device of the present invention, in which the oxygen reducing component consists of pellets; and FIG. 5 is a schematic of a side elevational view of the thermocouple device of the present invention, in which the oxygen reducing component is a tubular sleeve.

DETAILED DESCRIPTION OF THE PREFERRED EMBODIMENTS

Referring to the drawings, wherein like numerals indicate like elements throughout, there is shown in FIGS. 1-5 several preferred embodiments of a thermocouple device, generally designated 10, for measuring the temperature of a molten metal in accordance with the present invention.

The device 10 may be used for measuring the temperature of a variety of molten metals, such as steel, etc. The present thermocouple device 10 may be used to measure molten metal temperatures ranging from about 2500° F. to about 2950° F., and generally up to about 3300° F. The temperature range which the device 10 is capable of measuring is a function of the component materials of the device 10, among other factors.

As best shown in FIG. 1, the device 10 includes a thermocouple element, a portion of which is indicated generally at 12. Typically, the thermocouple element 12 consists of a positive element and a negative element (not shown). For purposes of the present discussion, in FIGS. 1-5 the positive element is shown as a positive wire 14 and the negative element is shown as a negative wire 16.

The positive wire 14 and negative wire 16 are typically formed from two different metals, such as platinum, a mixture of platinum and rhodium, chromel, constantan, iron, alumel and copper, for example. The thermocouple element 12 may be enclosed in a twin tube (not shown) to separate substantially the entire length of the positive wire 14 from the negative wire 16. The twin tube may be formed from alumina, as is well known to those of ordinary skill in the art.

The positive wire 14 and negative wire 16 of the thermocouple element 12 are connected at a hot junction (not shown), which is subjected to the elevated temperature of the metal melt. Generally, the hot junction of the thermocouple element 12 may be formed by twisting, welding, or clamping the positive wire 14 and the negative wire 16. One of ordinary skill in the art would understand that the hot junction may be joined by any means that would ensure good electrical continuity when in use.

For purposes of clarity, the twin tube and portions of the positive wire 14 and negative wire 16, including the hot junction, which are positioned within a retainer member 24 of the device 10 are not shown in the drawings. These components of the thermocouple element 12 are well known to those of ordinary skill in the art and further discussion thereof is not believed to be necessary. The retainer member 24 and other components of the device 10 will be discussed in detail below.

The thermocouple device 10 also includes a housing 18 comprised of a heat-resistant material. Preferably, the heat-resistant material comprises graphite and a metal oxide, such as aluminum oxide, magnesium oxide, silicon oxide, zirconium oxide and mixtures thereof.

The housing 18 is generally cylindrically-shaped and has a closed end 20 located proximate the hot junction of the thermocouple element 12 and an open end 22 spaced away from the hot junction. Preferably, the housing 18 is generally cylindrically-shaped to ensure uniform heat transfer across the wall of the housing 18 and to minimize temperature gradients along the length of the housing 1B, although the housing 18 may be formed in a variety of shapes. The housing 18 may be formed by any method well known to those of ordinary skill in the art, such as casting, molding, pressing, extruding, etc.

The thermocouple device 10 also includes a retainer member 24 for receiving the thermocouple element 12. The retainer member 24 may be formed from a ceramic material, preferably aluminum oxide.

Referring to FIG. 1, the retainer member 24 is preferably generally tubular to ensure a uniform temperature gradient along the length of the retainer member 24, although the shape of the retainer member 24 may be varied as desired in keeping with the spirit and scope of the present invention. The retainer member 24 has an open end 26 and a closed end 28. The closed end 28 of the retainer member 24 is located proximate the closed end 20 of the housing 18. The hot junction of the thermocouple element 12 is located proximate the closed end 28 of the retainer member 24.

The retainer member 24 is positioned within the housing and is smaller in size or diameter than the housing 18 to define a generally annular cavity 30 therebetween. The cavity 30 has an upper portion 32 having a diameter generally greater than the diameter of a lower portion 34 of the cavity 30. The upper and lower portions 32, 34 are connected by a sloping transitional area 36, as shown in FIG. 1. One of ordinary skill in the art would understand that the upper and lower portions 32, 34 of the cavity 30 may have equal diameters or the lower portion 34 may have a diameter which exceeds the diameter of the upper portion 32, as desired.

The diameter of the cavity 30 is generally larger than the outside diameter of the retainer member 24, and preferably about 8-15 mm. The cavity 30 extends from the closed end 20 of the housing to the open end 22 of the housing 18 opposite the closed end 20. The closed end 20 of the housing 18 is the end of the thermocouple device 10 which is immersed in the molten metal for temperature measurement.

The cavity 30 is substantially and preferably completely filled by a protective material and sealed with a plug 50 of a material such as cement. The protective material includes a metal oxide component and an oxygen reducing component. The metal oxide component may be selected from the group consisting of aluminum oxide, magnesium oxide, manganese oxide, titanium oxide, vanadium oxide, zirconium oxide and mixtures thereof. Preferred metal oxide components include aluminum oxide, which is relatively inexpensive, magnesium oxide and zirconium oxide.

As shown in FIGS. 1-5, the metal oxide component is preferably in the form of a powder 38, although one of ordinary skill in the art would understand that the metal oxide component may have any shape or form, such as a tube which substantially surrounds the thermocouple element 12. In the present embodiment, it is preferred that the metal oxide component be in the form of a powder having an average particle size or diameter less than about 250 μm, however the metal oxide powder may consist of a variety of different sized particles, as desired.

The oxygen reducing component of the protective material prevents the formation of corrosive and reactive gases such as silicon monoxide and carbon monoxide which may damage or destroy the retainer member 24 and thermocouple element 12. The oxygen reducing component reacts with oxygen to suppress the formation of any oxide gases, such as silicon monoxide and carbon monoxide, and thereby prevent damage to the retainer member 24 or thermocouple element 12.

Preferably, the oxygen reducing component is generally evenly distributed throughout the cavity 30 at least proximate the closed end 28 of the retainer member 24. The metal oxide component promotes even distribution of the oxygen reducing component throughout the cavity 30.

The oxygen reducing component may be selected from the group consisting of aluminum, magnesium, manganese, titantium, vanadium, zirconium and mixtures thereof. Preferably, the oxygen reducing component is aluminum.

The oxygen reducing component of the protective material may take a variety of physical configurations, or combinations of different configurations. For example, the oxygen reducing component may be selected from the group consisting of powder 40, granules, and mixtures thereof. As best shown in FIG. 1, the oxygen reducing powder 34 and metal oxide powder 40 may be intermixed to substantially fill the cavity 30 and form a protective barrier between the housing 18 and the retainer member 24 to prevent damage or destruction of the retainer member 24 and thermocouple element 12.

Generally, it is desirable to avoid direct contact of the oxygen reducing component and both the retainer member 24 and housing 18 to prevent formation of a heat bridge which could expose the retainer member 24 to uneven thermomechanical stress. By intermixing the metal oxide powder 38 with the oxygen reducing component and by using only oxygen reducing components (powder 38, granules, etc.) which are substantially smaller than the dimension of the cavity 30, the heat bridge effect may be minimized or avoided.

In an alternative embodiment best shown in FIGS. 3 and 4, the oxygen reducing component may be embedded in the metal oxide of the protective material. The oxygen reducing component may comprise one or more generally continuous wires 42 (only two shown for clarity), which may encircle or partially encircle the retainer member 24 best shown in FIG. 3, or a plurality or dispersed pellets 44 or grains, best shown in FIG. 4.

As best shown in FIG. 2, the oxygen reducing component may additionally or alternatively be selected from the group consisting of one or more rods 46 (only two being shown for clarity), ribbons, wire wrap, and mixtures thereof. The rods 46 which extend along a substantial portion of the length of the retainer member 24, particularly proximate the closed end 28, may be embedded in the metal oxide powder of the protective material at spaced locations around the circumference of the retainer member 24.

As best shown in FIG. 2, the rods 46 are preferably generally parallel to the longitudinal axis (not shown) of the retainer member 24. One of ordinary skill in the art would understand that the rods 46 may be positioned, for example, at an angle to the longitudinal axis so long as contact of the rods 46 with the retainer member 24 and housing 18 is inhibited to prevent formation of a heat bridge between the retainer member 24 and housing 18 and to provide a substantially uniform thermal gradient along the length of the device 10.

As best shown in FIG. 5, in another alternative embodiment, the oxygen reducing component may be a generally tubular sleeve 48 which at least partially encompasses the metal oxide component or powder 38 of the protective material. The tube or sleeve 48 may have perforated cylinder walls (not shown). In the present embodiment, it is also contemplated that the metal oxide of the protective material may be formed in the shape of a tube (not shown). With reference to FIG. 5, a metal oxide tube may be positioned within the sleeve 48 of the oxygen reducing component, for example. Alternatively, the tube of metal oxide may be positioned to substantially surround the sleeve 48 of the oxygen reducing component (not shown). One of ordinary skill in the art would also understand that a plurality of metal oxide and oxygen reducing sleeves may be used in accordance with the present invention. For example, an outer sleeve 48 of an oxygen reducing component may surround alternating inner tubes of metal oxide and sleeves of the same or other oxygen reducing components (not shown).

The form of the oxygen reducing component is not restricted to the groups specifically discussed above, such as powders, granules, wires, pellets, tubes, discs, etc.

The oxygen reducing component may comprise about 5% to about 95% by volume of the protective material. Preferably, the oxygen reducing component comprises about 15% to about 75% by volume of the protective material. More preferably, the oxygen reducing component comprises about 25% to about 65%, and most preferably about 40% to about 50% by volume of the protective material.

To assemble the device 10, the thermocouple element 12 may be inserted into the retainer member 24 prior to or after insertion of the retainer member 24 into the cavity 30 of the housing 18. The cavity 30 may be substantially filled with the protective material prior to or subsequent to insertion of the retainer member 24 into the cavity 30. The metal oxide and oxygen reducing components of the protective material may be intermixed by any means well known to one of ordinary skill in the art prior to, during, or after insertion into the cavity 30. For example, if the metal oxide and oxygen reducing components of the protective material are both in powdered, granulated or pelletized form, the components may be intermixed by a conventional mixer, such as a commercial food mixer available from Crypto Peerless Ltd. of Birmingham, England, for example.

When the oxygen reducing material is in the form of rods 46, as shown in FIG. 2, the metal oxide powder 38 and retainer member 24 may, for example, be positioned in the cavity 30 prior to insertion of the rods 46 so that the rods 46 may be aligned substantially parallel to the retainer member 24 in a longitudinal direction. To assemble the embodiment shown in FIG. 3, the wires 42 may be wound around the retainer member 24 prior to inserting the retainer member 24 into the cavity 30 and the subsequent addition of the metal oxide component. Alternatively, when the oxygen reducing material is in the form of a sleeve 48, shown in FIG. 5, the sleeve 48 may be inserted into the cavity 30 prior to or after insertion of the metal oxide component and retainer member 24, for example.

As best shown in FIG. 1, after inserting the retainer member 24 and protective material into the cavity 30, the cavity 30 may be substantially sealed by a plug 50 which surrounds the open end 26 of the retainer member 24 and fills part of the upper portion 32 of the cavity 30. The plug 50 is preferably formed from a material such as cement. The open end 26 of the retainer member 24 may be inserted into the plug 50 prior to insertion of the retainer member 24 and plug 50 into the cavity 30. One of ordinary skill in the art would understand that the methods of assembling the device 10 set forth above are examples of the various methods of assembly and are not intended to be limiting.

From the foregoing description, it can be seen that the present invention comprises a device for measuring the temperature of a molten metal. It will be appreciated by those skilled in the art that changes could be made to the embodiments described above without departing from the broad invention concepts thereof. It is understood, therefore, that this invention is not limited to the particular embodiments disclosed, but it is intended to cover all modification which are within the spirit and scope of the invention as defined by the appended claims.

I claim:

1. A device for measuring the temperature of a molten metal, said device comprising a thermocouple element, a housing comprised of a heat-resistant material, and a retainer member for receiving the thermocouple element, said retainer member having an open end and a closed end, said thermocouple element having a hot junction located proximate said closed end of said retainer member, said retainer member being positioned within said housing and being smaller in size than said housing to define a cavity therebetween, said cavity being substantially filled by a protective material comprising a metal oxide component and an oxygen reducing component.

2. A device according to claim 1, wherein said heat-resistant material comprises a metal oxide and graphite.

3. A device according to claim 2, wherein said metal oxide of said heat-resistant material is aluminum oxide.

4. A device according to claim 1, wherein said retainer member is ceramic.

5. A device according to claim 1, wherein said retainer member is generally tubular.

6. A device according to claim 1, wherein said metal oxide component of said protective material is selected from the group consisting of aluminum oxide, magnesium oxide, manganese oxide, titanium oxide, vanadium oxide, zirconium oxide, and mixtures thereof.

7. A device according to claim 1, wherein said metal oxide component of said protective material is aluminum oxide.

8. A device according to claim 1, wherein said metal oxide component of said protective material is a powder.

9. A device according to claim 1, wherein said oxygen reducing component is selected from the group consisting of aluminum, magnesium, manganese, titanium, vanadium, zirconium, and mixtures thereof.

10. A device according to claim 1, wherein said oxygen reducing component is aluminum.

11. A device according to claim 10, wherein said aluminum comprises about 15% to about 70% by volume of said protective material.

12. A device according to claim 10, wherein said aluminum comprises about 25% to about 65% by volume of said protective material.

13. A device according to claim 1, wherein said oxygen reducing component comprises about 5% to about 95% by volume of said protective material.

14. A device according to claim 1, wherein said oxygen reducing component is selected from the group consisting of powder, granules, and mixtures thereof.

15. A device according to claim 1, wherein said oxygen reducing component is embedded in said metal oxide component of said protective material, said oxygen reducing component being selected from the group consisting of wires, pellets, grains, and mixtures thereof.

16. A device according to claim 1, wherein said oxygen reducing component is selected from the group consisting of rods, ribbons, wire wrap, and mixtures thereof.

17. A device according to claim 16, wherein said oxygen reducing component comprises a plurality of rods, said rods being generally parallel to a longitudinal axis of said retainer member.

18. A device according to claim 1, wherein said oxygen reducing component is a sleeve which at least partially encompasses said metal oxide component of said protective material.

* * * * *

(12) EX PARTE REEXAMINATION CERTIFICATE (7923rd)
United States Patent
Kendall

(10) Number: US 5,209,571 C1
(45) Certificate Issued: Dec. 14, 2010

(54) DEVICE FOR MEASURING THE TEMPERATURE OF A MOLTEN METAL

(75) Inventor: Martin Kendall, Sheffield (GB)

(73) Assignee: Heraeus Electro-Nite Co., Langhorne, PA (US)

Reexamination Request:
No. 90/010,704, Oct. 1, 2009

Reexamination Certificate for:
Patent No.: 5,209,571
Issued: May 11, 1993
Appl. No.: 07/910,964
Filed: Jul. 9, 1992

(51) Int. Cl.
*G01K 7/04* (2006.01)

(52) U.S. Cl. .............. 374/139; 374/140; 374/179; 374/208; 374/E1.015; 374/E1.017; 374/E7.009; 136/233; 136/234; 266/88

(58) Field of Classification Search .............. 374/139
See application file for complete search history.

(56) References Cited

U.S. PATENT DOCUMENTS

| | | | |
|---|---|---|---|
| 2,802,894 A | 8/1957 | Schneider et al. | |
| 2,915,575 A | 12/1959 | Thomas | 136/223 |
| 2,948,766 A | 8/1960 | Schneider | 136/232 |
| 3,116,168 A | 12/1963 | Gee | |
| 3,379,678 A | 4/1968 | McTaggari | 136/234 |
| 3,652,427 A | 3/1972 | Flood et al. | 205/783.5 |
| 3,821,030 A | 6/1974 | Darling | |
| 4,135,538 A | 1/1979 | Kurita | 136/234 |
| 4,406,754 A | 9/1983 | Narita et al. | |
| 4,721,533 A | 1/1988 | Phillippi et al. | |
| 4,984,904 A | 1/1991 | Nakano | 374/139 |
| 5,071,258 A | 12/1991 | Usher et al. | |
| 5,181,779 A | 1/1993 | Shia et al. | |
| 5,209,471 A | 5/1993 | Horiuchi et al. | |
| 5,474,518 A | 12/1995 | Allaire | |

FOREIGN PATENT DOCUMENTS

| | | |
|---|---|---|
| CN | 2063634 | 10/1990 |
| CN | 2708284 Y | 7/2005 |
| DE | 834757 C | 4/1952 |
| DE | 10106476 B | 9/1957 |
| DE | 1573271 | 6/1970 |
| DE | 1 648 261 | 5/1971 |
| DE | 1648923 A | 5/1971 |
| DE | 1648923 A1 | 5/1971 |
| DE | 7419633 U | 10/1974 |
| DE | 3112218 A1 | 2/1982 |
| DE | 3725615 C2 | 2/1988 |
| GB | 901657 | 7/1962 |
| GB | 1113460 A | 5/1968 |
| GB | 1119338 | 7/1968 |
| GB | 1151019 | 5/1969 |
| GB | 2 193 375 | 2/1988 |
| JP | 60198423 | 7/1985 |
| JP | 6168525 A | 4/1986 |
| JP | 61246636 | 11/1986 |
| JP | 8021768 A | 1/1996 |
| JP | 8271347 A | 10/1996 |
| JP | 11166865 A | 6/1999 |

OTHER PUBLICATIONS

Spooner and Thomas, "Longer Life for Chromel–Alumel Thermocouples," *Metal Progress*, 1955, vol. 68, No. 5, American Society for Metals, Mt. Morris, Illinois.

Espe et al., "Getter Materials for Electron Tubes," *Electronics*, Oct. 1950, vol. XXIII, pp. 80–86, McGraw–Hill Publishing Company, New York, NY.

(Continued)

*Primary Examiner*—Pia Tibbits

(57) ABSTRACT

The present invention is a device for measuring the temperature of a molten metal. The device includes a thermocouple element, a housing consisting of a heat-resistant material and a retainer member for receiving the thermocouple element. The retainer member has an open end and a closed end. The thermocouple element has a hot junction located proximate the closed end of the retainer member. The retainer member is positioned within the housing and is smaller in size than the housing to define a cavity therebetween. The cavity is substantially filled by a protective material which includes a metal oxide component and an oxygen reducing component.

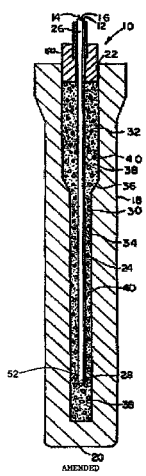

OTHER PUBLICATIONS

Dieter Weber, et al. "Elektrische Temperaturmessung," 1991, p. 26.

Vesuvius "Accumetrix Continuous Temperature Measurement System," 1991 (brochure).

A.F. Holleman, et al. "Lehrbuch der Anorganischen Chemie," 1985, pp. 1062, 1067.

Rommps Chemie Lexicon, Franckh'sche Vertagshandlung, W. Keller & Co., Stuttgart, p. 1471 (1981).

V.N. Zhuchin, et al. "Protective Sheath for Thermocouples Measuring the Temperature of Liquid Steel," 1984, pp. 385–387.

Robert L. Powell et al., "Thermocouple Reference Tables Based on the IPTS–68," National Bureau of Standards, cover page and pp. 8–11 (Mar. 1974).

D. Bediones et al., "Criteria for the Selection of Thermocouples Versus RTD's Industrial Applications," Instrument Society of America, cover page and pp. 1–3 (Oct. 1991).

Morrell, R., "Handbook of Properties of Technical of Engineering Ceramics: Part 1—An Introduction for the Engineer and Designer," National Physical Laboratory, cover page, copyright page and pp. 186–187 (1985).

Pollock, Daniel D., "Thermoelectricity: Theory Thermometry Tool," American Society for Testing and Materials, cover page and pp. 182–183 (Jan. 1985).

E.C. Magison, "Temperature Measurement in Industry," Instrument Society of America, cover page, copyright page and p. 41 (1990).

"Techniques for Approximating the International Temperature Scale of 1990," International Bureau of Weights and Measures, cover page pp. 99–101 (1990).

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 45-54:

The positive wire 14 and negative wire 16 of the thermocouple element 12 are connected at a hot junction (not shown) located at *52*, which is subjected to the elevated temperature of the metal melt. Generally, the hot junction of the thermocouple element 12 may be formed by twisting, welding, or clamping the positive wire 14 and the negative wire 16, One of ordinary skill in the art would understand that the hot junction may be joined by any means that would ensure good electrical continuity when in use.

AS A RESULT OF REEXAMINATION, IT HAS BEEN DETERMINED THAT:

The patentability of claims 1-18 is confirmed.

\* \* \* \* \*